US012721772B1

(12) United States Patent
Reaves et al.

(10) Patent No.: US 12,721,772 B1
(45) Date of Patent: Sep. 1, 2026

(54) URN PEDESTAL FOR FUNERAL VEHICLE

(71) Applicant: Federal Eagle, LLC, West Chester, OH (US)

(72) Inventors: Donald Reaves, West Chester, OH (US); Stephen Bentley, West Chester, OH (US)

(73) Assignee: FederalEagle, LLC, West Chester, OH (US)

( * ) Notice: Subject to any disclaimer, the term of this patent is extended or adjusted under 35 U.S.C. 154(b) by 0 days.

(21) Appl. No.: 18/483,764

(22) Filed: Oct. 10, 2023

Related U.S. Application Data

(60) Provisional application No. 63/378,946, filed on Oct. 10, 2022.

(51) Int. Cl.
*A61G 17/08* (2006.01)
*A61G 21/00* (2006.01)
*B60H 1/00* (2006.01)

(52) U.S. Cl.
CPC ............. *A61G 17/08* (2013.01); *A61G 21/00* (2013.01); *B60H 1/00028* (2013.01)

(58) Field of Classification Search
CPC ...... A61G 17/08; A61G 21/00; E04H 13/008; B60H 1/00028; B60R 2011/0007; B60R 7/06
USPC .............. 27/1; 296/24.34, 16, 18; 211/85.27
See application file for complete search history.

(56) References Cited

U.S. PATENT DOCUMENTS 2,400,312 A * 5/1946 Miller .................... A61G 21/00 414/532
2,460,712 A * 2/1949 Peterson ................ B60N 3/001 414/532
3,572,562 A * 3/1971 Floyd, Jr. ............... A61G 21/00 296/18
4,607,417 A 8/1986 Hancovsky
D304,641 S * 11/1989 Bourassa ......................... D99/7
5,172,457 A * 12/1992 Allen ..................... A61G 17/08 27/1
D334,642 S * 4/1993 Allen ............................... D99/5
D341,467 S * 11/1993 Allen ............................... D99/5
5,664,714 A * 9/1997 Navarro .................. B60R 11/02 224/564
5,709,441 A * 1/1998 Bartling ............... A47B 87/007 312/223.5
6,044,532 A * 4/2000 Bowling ................ A61G 17/08 108/150
6,254,152 B1 7/2001 Tillett
6,604,532 B1 8/2003 Mcclendon et al.
7,043,803 B2 * 5/2006 Chen ...................... A61G 17/08 27/1

(Continued)

FOREIGN PATENT DOCUMENTS

CA 2311959 A1 12/2001
CN 2836780 Y * 11/2006

(Continued)

*Primary Examiner* — William L Miller
(74) *Attorney, Agent, or Firm* — Wood, Herron and Evans, LLP

(57) ABSTRACT

An urn pedestal for a funeral vehicle having a passenger cabin is disclosed. The urn pedestal includes a support that extends from a base to a top that includes a display configured to receive an urn. The support is configured to be secured to a part of the funeral vehicle such that the urn is viewable from the passenger cabin of the funeral vehicle.

23 Claims, 14 Drawing Sheets

(56) References Cited

U.S. PATENT DOCUMENTS

| | | | | |
|---|---|---|---|---|
| 7,178,209 | B1 | 2/2007 | Radziewicz | |
| 7,191,498 | B2 * | 3/2007 | Fischer | A61G 17/007 27/1 |
| 7,621,575 | B1 | 11/2009 | Kellerman | |
| 8,083,275 | B2 * | 12/2011 | Myhre | A61G 19/00 294/16 |
| 8,256,356 | B2 | 9/2012 | Fremming | |
| 8,631,983 | B2 * | 1/2014 | King | B60R 11/0241 224/555 |
| 8,689,412 | B2 | 4/2014 | Grover | |
| 8,959,731 | B2 | 2/2015 | Lynch | |
| 9,155,673 | B2 * | 10/2015 | Bailey | E04H 13/008 |
| 10,828,219 | B2 * | 11/2020 | Podolske | A61G 17/08 |
| 11,458,059 | B2 * | 10/2022 | Bell | A61G 17/08 |
| 11,484,457 | B1 | 11/2022 | Corum et al. | |
| 11,951,049 | B2 * | 4/2024 | Reynolds | A61G 17/0407 |
| 12,102,573 | B2 * | 10/2024 | Gills | G06F 3/14 |
| D1,049,719 | S * | 11/2024 | Sabo, Jr. | D6/675 |
| D1,089,938 | S * | 8/2025 | Reaves | D99/9 |
| 2009/0174205 | A1 * | 7/2009 | Kim | A61G 21/00 296/16 |
| 2009/0178594 | A1 * | 7/2009 | Fremming | A47B 37/00 108/50.11 |
| 2013/0086780 | A1 * | 4/2013 | Grover | A61G 21/00 27/27 |
| 2016/0023700 | A1 * | 1/2016 | Dugan | A61G 21/00 296/24.33 |
| 2016/0353188 | A1 | 12/2016 | Epps | |
| 2022/0396966 | A1 * | 12/2022 | Sabo | A47F 7/28 |
| 2023/0265675 | A1 * | 8/2023 | Gibson | E04H 13/001 52/134 |
| 2024/0156663 | A1 * | 5/2024 | Miller | G07C 9/00896 |
| 2025/0221874 | A1 * | 7/2025 | Reaves | A61G 21/00 |

FOREIGN PATENT DOCUMENTS

| | | | | |
|---|---|---|---|---|
| KR | 101627240 | B1 | 6/2016 | |
| KR | 20220145564 | A * | 10/2022 | |
| WO | WO-2021253110 | A1 * | 12/2021 | E04H 13/001 |

* cited by examiner 52
90
92
46
66
116
114
96
120
118
A1
126
132
60
38
A2
124
100
62
68
102
110
104
~42~
98
70
94
122
142
30
40
10

URN PEDESTAL FOR FUNERAL VEHICLE

CROSS-REFERENCE TO RELATED APPLICATION

This application claims the benefit of U.S. Provisional Application Ser. No. 63/378,946 filed on Oct. 10, 2022, the disclosure of which is incorporated by reference in its entirety.

TECHNICAL FIELD

The present invention relates generally to funeral services, and relates, more specifically, to means and an apparatus for transporting cremated remains.

BACKGROUND

This section is intended to introduce the reader to various aspects of art that may be related to various aspects of the present invention, which are described and/or claimed below. This discussion is believed to be helpful in providing the reader with background information to facilitate a better understanding of various aspects of the present invention. Accordingly, it should be understood that these statements are to be read in this light, and not as admissions of prior art.

Solutions for incorporating a decedent's cremated remains into traditional funeral services are lacking especially with respect to funeral vehicles. Hearses are typically used to transport caskets, but are generally not chosen by families for transporting cremated remains during funeral services. Manufacturers of funeral vehicles have previously attempted to develop various features to enable an urn with cremated remains to be displayed and secured in the casket compartment of a hearse, but usage rates of such features remain low.

Accordingly, it would be desirable to provide an appealing and respectful solution for transporting cremated remains in a funeral vehicle.

SUMMARY

According to one aspect of the present invention, an urn pedestal for a funeral vehicle having a passenger cabin is disclosed. The urn pedestal includes a support that extends from a base to a top that includes a display that is configured to receive an urn. The support is configured to be secured to a part of the funeral vehicle such that the urn is viewable from the passenger cabin of the funeral vehicle.

According to one embodiment of the invention, the urn pedestal may include a top cover that is removably attached to the top of the support. This allows the top cover to be selectively switched out depending on the circumstances of the funeral, for example, The top cover may include the display. In one embodiment, the display may include an urn cradle that is removably attached to the top of the support. The urn cradle may be configured to receive the urn. For example, in one embodiment, the urn cradle may be configured to support the urn in an upright position.

According to one embodiment, the display may include at least two adjustable arms movably attached to the top of the support and the urn may be received between the at least two adjustable arms. Furthermore, the top of the support may include at least two tracks and each track may be configured to movably receive one of the at least two adjustable arms such that the at least two adjustable arms are movable in a horizontal direction relative to the urn. For example, each adjustable arm may extend from the top of the support to a distal end that includes a clamp that is configured to extend partially about the urn. In this way, the urn may be securely received by the display on the urn pedestal.

According to one embodiment, the urn pedestal may include a partition that extends in an upward direction from the top of the support and is configured to provide separation and privacy between, for example, a driver cabin, where the driver of the funeral vehicle sits, and a passenger cabin, where family members sit. The partition may be configured to removably receive a removable display visual. The display visual may take a wide range of forms (text, symbols, pictures, illustrations, etc.) and be selected for the particular circumstances of the funeral.

According to one embodiment, the support may include an antependium that extends downward from the top of the support to cover a portion of a front of the support. For example, the antependium may extend from the top of the support to the base of the support. In one embodiment, the antependium many include columns and/or decorative panels suitable for the circumstances of the funeral.

According to one embodiment, the top of the support may include one or more video screens. In another embodiment, the top of the support may include one or more indents configured to receive various items, such as a cup or a phone. In one embodiment, the support may include one or more charge ports that are configured to be operatively coupled to an electrical system of the funeral vehicle.

According to yet another embodiment, the support may include a pair of arms, each arm extending from a side of the support. The pair of arms may define part of the top of the support. In one embodiment, each arm may include a lighting element that is configured to cast light onto a floor of the funeral vehicle. In another embodiment, the top of the support may include at least one lighting element that is configured to cast light onto the display.

According to one embodiment, the support may include one or more air vents that are configured to be operatively coupled to an HVAC system of the funeral vehicle. For example, the support may include internal ductwork configured to direct airflow from the HVAC system of the funeral vehicle to the one or more air vents.

According to one embodiment, the part of the funeral vehicle to which the support is configured to be attached may be a center console and/or a floor of the funeral vehicle.

In yet another embodiment, the top of the support may include at least one receiver that is configured to receive a display of flowers. For example, the receiver may include at least two adjustable arms movably attached to the top of the support. The display of flowers may be received between the at least two adjustable arms.

In another aspect according to the invention, a funeral vehicle may include the urn pedestal of according to the aspect described above. The funeral vehicle may further include ceiling lighting that is configured to cast light onto the urn pedestal.

According to another aspect of the invention, a method of installing an urn pedestal for a funeral vehicle is disclosed. The method includes providing the urn pedestal which includes a support that is configured to be secured to a part of the funeral vehicle. The support includes a first top cover removably attached to a top of the support. The top cover includes a first display that is configured to receive an urn such that the urn is viewable from a passenger cabin of the funeral vehicle. The method includes removing the first top cover from the top of the support and installing a second top cover to the top of the support. The second top cover includes a second display that is configured to receive the urn such that the urn is viewable from the passenger cabin of the funeral vehicle.

According to one embodiment, the support may include a partition that extends in an upward direction from the top of the support. The partition may be configured to removably receive a display visual. The method may further include removing a first display visual from the partition and installing a second display visual to the partition.

According to another aspect of the invention, a method of assembling an urn pedestal for a funeral vehicle with an urn is provided. The method includes providing the urn pedestal which includes a support that is configured to be secured to a part of the funeral vehicle. The support includes a top that includes at least two adjustable arms and an urn cradle that is configured to receive the urn such that the urn is viewable from a passenger cabin of the funeral vehicle. The method includes placing the urn in an upright position in the urn cradle and moving each of the at least two adjustable arms in a horizontal direction toward the urn to secure the urn in place relative to the urn cradle.

Additional features and advantages will be set forth in the detailed description which follows, and in part will be readily apparent to those skilled in the art. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings, which are incorporated in and constitute a part of this specification, illustrate embodiments of the invention and, together with the Detailed Description given below, serve to explain the invention.

DETAILED DESCRIPTION

The exemplary embodiments described herein are provided for illustrative purposes and are not limiting. Other exemplary embodiments are possible, and modifications may be made to the exemplary embodiments within the scope of the present disclosure. Therefore, this Detailed Description is not meant to limit the scope of the present disclosure.

As described above, solutions for respectfully incorporating a decedent's cremated remains into traditional funeral services are lacking. Various aspects of the present invention address this issue by providing an urn pedestal for respectfully, and in an appealing manner, displaying and transporting an urn in a funeral vehicle. The funeral vehicle may be a limousine, for example, that carries both the urn and the decedent's family. In that regard, the urn pedestal provides a display that presents the urn along with other commemorative display visuals to the decedent's family during transport. For example, the urn pedestal may include a front display that forms an antependium that is decorated with religious symbols or scenes. The urn pedestal is configured to accommodate all types of religions, and one or more components of the urn pedestal may be interchangeable for this reason. Other advantages and technical effects of the embodiments of this invention will become evident to one skilled in the art from the following description.

Figure 1:
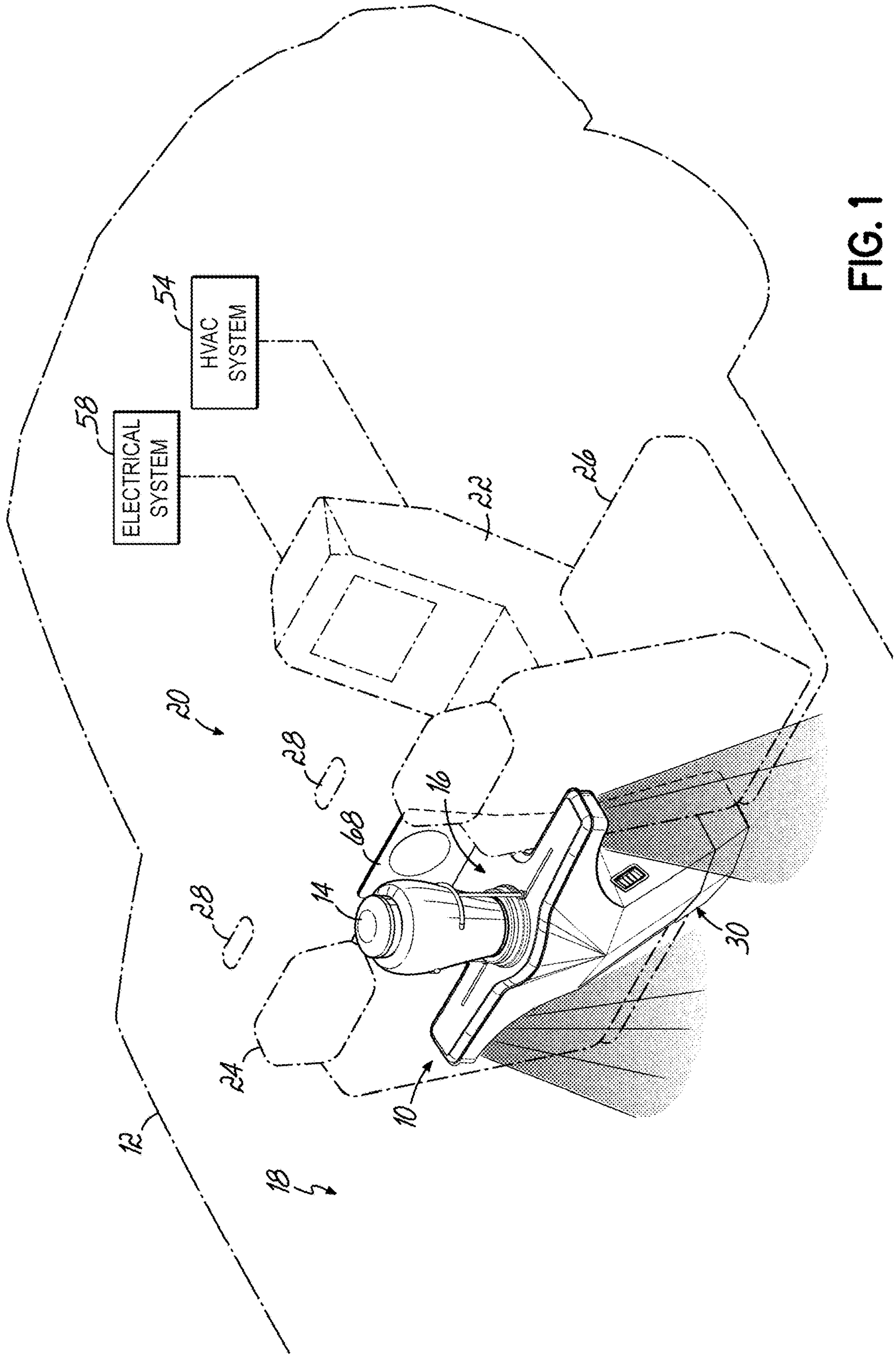
FIG. 1 is an environmental, perspective view of an embodiment of an urn pedestal in accordance with principles of the present invention.

Referring now to the figures, embodiments of an urn pedestal 10 for use in a funeral vehicle 12 (e.g., limousine) in accordance with principles of the present invention are shown. Referring now to FIG. 1, the figure shows an embodiment of the urn pedestal 10, with an urn 14 located thereon. In particular, the urn pedestal 10 includes a display 16 that is configured to receive the urn 14 to display the urn 14 to occupants (e.g., the decedent's friends and family) who may be riding along in the funeral vehicle 12. In that regard, the urn pedestal 10 is configured to be installed in the funeral vehicle 12 such that the display 16, and specifically the urn 14, is viewable from a passenger cabin 18 of the funeral vehicle 12. The urn 14 may also be viewable from a driver cabin 20 of the vehicle 12, however, the display 16 is configured to display the urn 14 to passengers riding in the passenger cabin 18. In other words, when located on the urn pedestal 10, the urn 14 may be visible to all front and the rear seat occupants of the funeral vehicle 12. Such is a warmer, more respectful, and more appealing way to display and transport an urn 14 in a funeral vehicle 12; particularly, in comparison to existing solutions for incorporating a decedent's cremated remains into traditional funeral services.

Though the funeral vehicle 12 shown in in FIG. 1 is a limousine, such as an XT-5 6-door limousine, the urn pedestal 10 is adaptable to any sort of passenger vehicle. For example, the urn pedestal 10 could also be used in a sedan, passenger van, or SUV being used as a funeral vehicle 12 to transport the decedent's cremated remains and the decedent's family during traditional funeral services and related events, such as to pick up remains at a crematory or to bring remains to the family home. In either case, the urn pedestal 10 is configured to be secured to a part of the funeral vehicle 12 to secure the urn pedestal 10 in place while the funeral vehicle 12 is moving. In the embodiment shown, the urn pedestal 10 is installed into the funeral vehicle 12 by fitting the urn pedestal 10 around a rear of the vehicle's 12 center console 22. As shown, the center console 22 is located between a driver's seat 24 and a passenger's seat 26 in the driver cabin 20 of the vehicle 12. The urn pedestal 10 may be secured in place via a friction fit between the driver's and passenger's seats 24, 26, for example. In addition, or alternatively, the urn pedestal 10 may be removably fixed (e.g., by mechanical fasteners) to the vehicle 12. For example, the urn pedestal 10 could be bolted to a floor of the vehicle 12, attached to the center console 22 of the vehicle 12 (e.g., by clips, brackets, fasteners, or other hardware), and/or attached to the driver's and passenger's seats 24, 26 of the vehicle 12 (e.g., by straps).

With continued reference to FIG. 1, the funeral vehicle 12 may include overhead ceiling lighting 28 that is configured to illuminate the urn pedestal 10. In that regard, the ceiling lighting 28, which may include one or more light fixtures, is used to feature and prominently display the urn 14. The ceiling lighting 28 may be utilized while passengers are entering and exiting the funeral vehicle 12 and during placement of the urn 14 on the urn pedestal 10 in the funeral vehicle 12, for example. The ceiling lighting 28 may remain on while the urn 14 is being transported by the funeral vehicle 12. To this end, the ceiling lighting 28 is configured to cast light onto the display 16 of the urn pedestal 10, including the urn 14, to present the urn 14 in a warmer, more respectful, and more appealing way to occupants in the vehicle 12.

Figure 2:
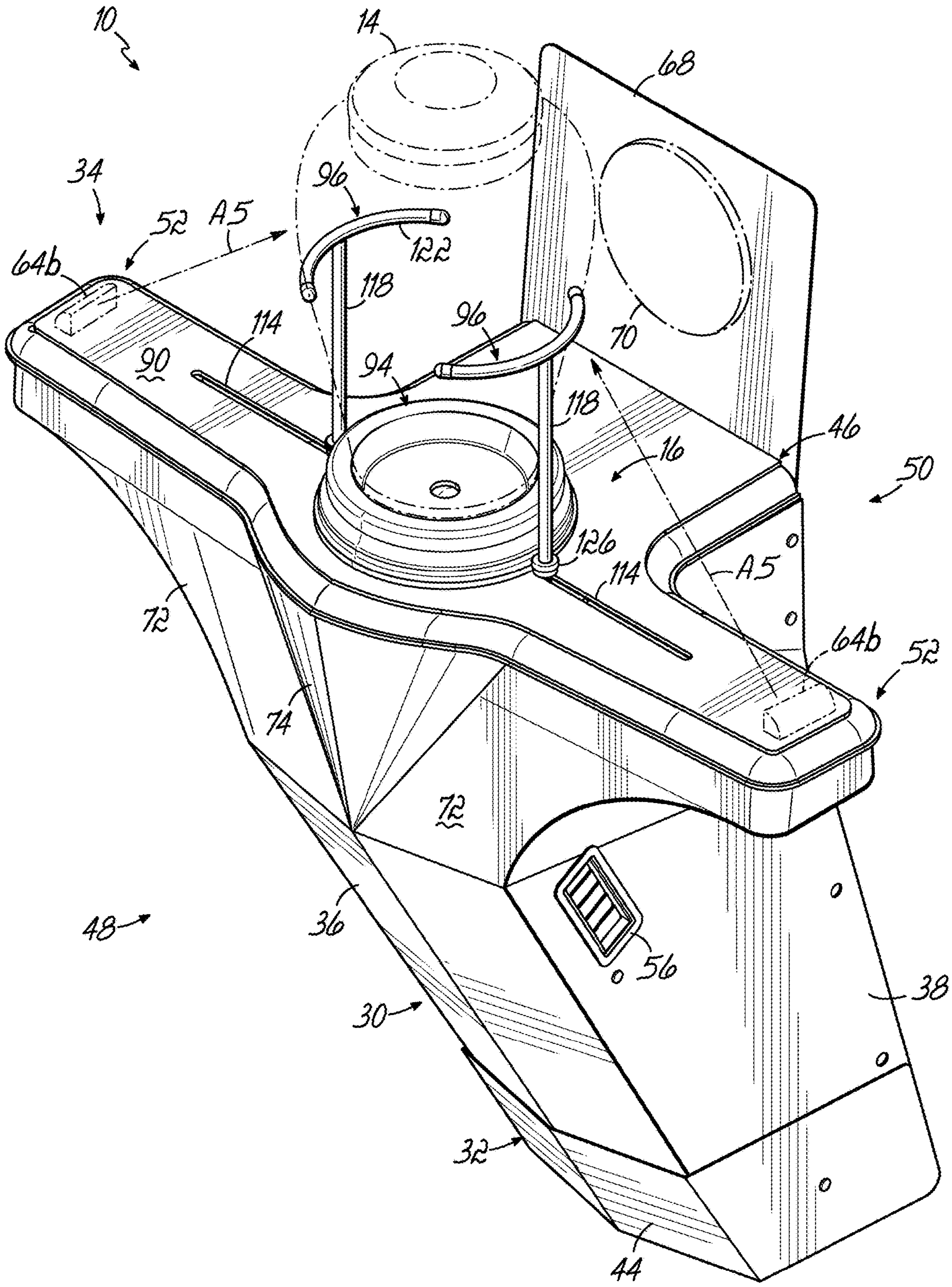
FIG. 2 is a perspective view of the urn pedestal of FIG. 1.
Figure 3:
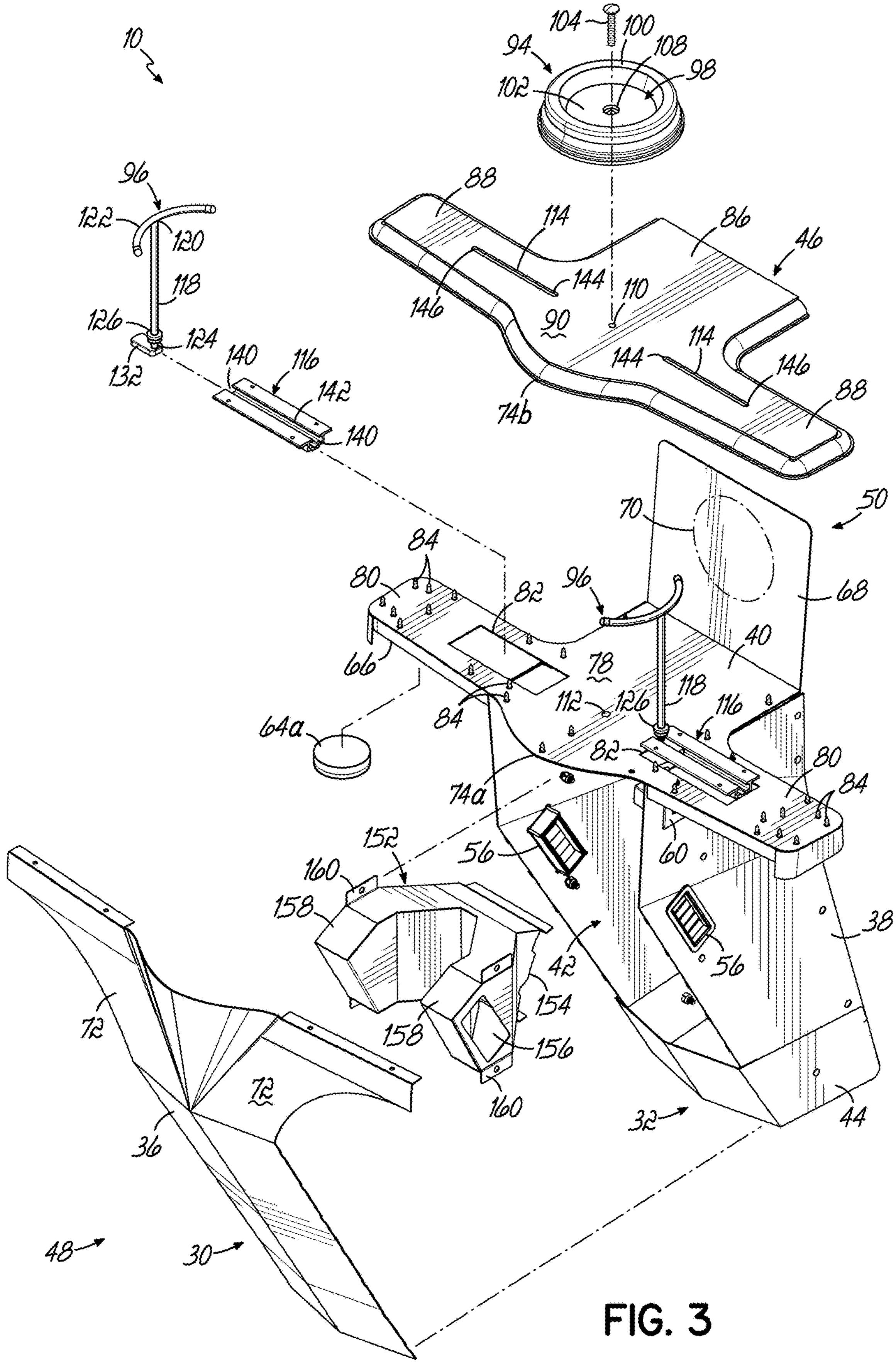
FIG. 3 is a partial disassembled view of the urn pedestal of FIGS. 1 and 2.
Figure 4:
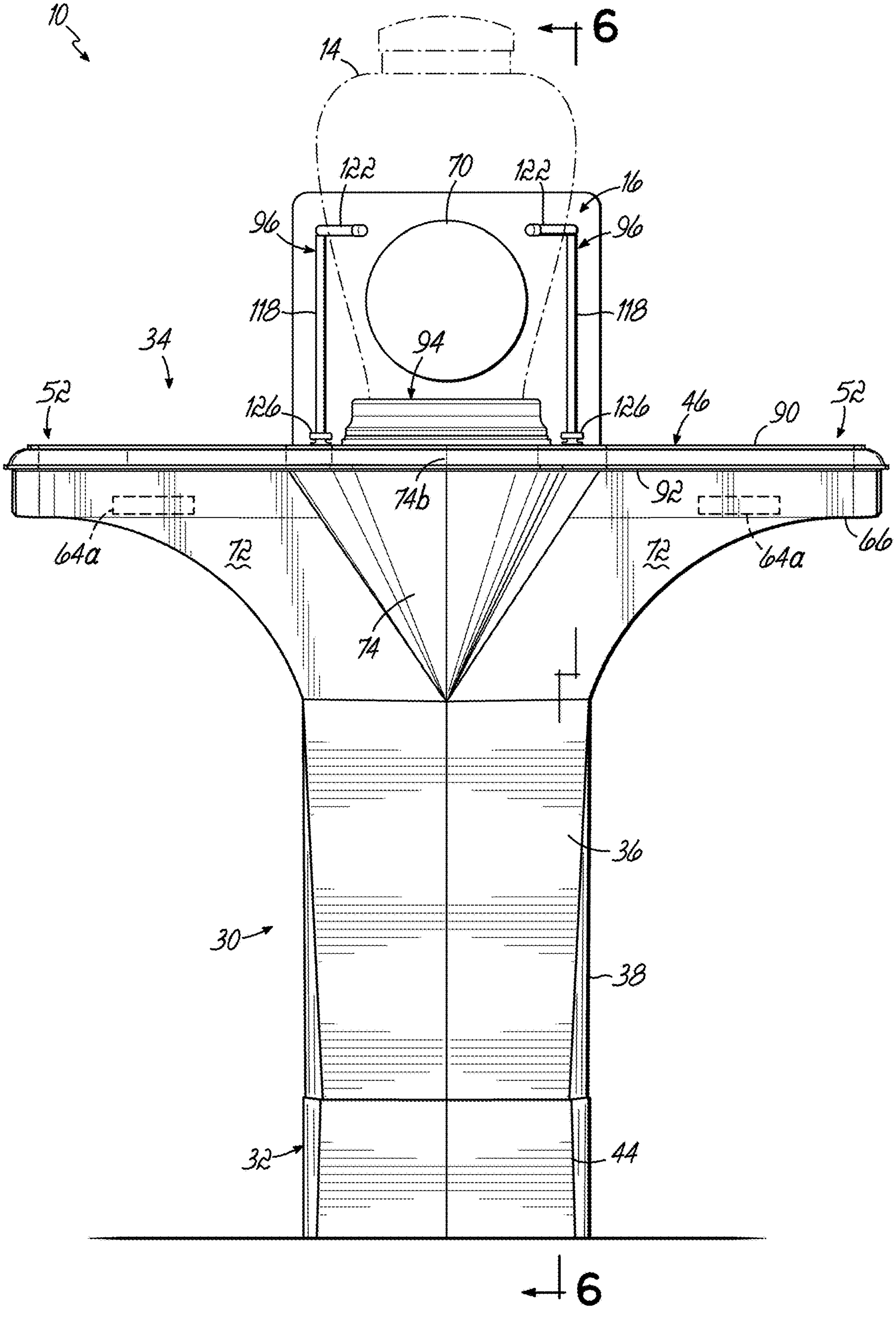
FIG. 4 is a front view of the urn pedestal of FIGS. 1-3.

Referring now to FIGS. 2-4, the urn pedestal 10 includes a support 30 that extends vertically upwards (e.g., from the floor of the funeral vehicle 12 when installed in the funeral vehicle 12, for example) from a base 32 of the urn pedestal 10 to a top 34 of the urn pedestal 10 that includes the display 16. The support 30 includes a front wall 36, a pair of sidewalls 38, and a top wall 40 that together define an interior 42 of the support 30. The base 32 may include a skirt 44 that wraps around parts of the front wall 36 and the sidewalls 38. The skirt 44 may reinforce the base 32 of the support 30 and serve as a decorative piece, for example. The top wall 40 is generally "T"-shaped and is configured to removably receive a top cover 46 of the urn pedestal 10, as will be described in further detail below.

The front wall 36 of the support 30 may define a front 48 of the urn pedestal 10 opposite a back 50 of the urn pedestal 10. The front 48 of the urn pedestal 10 is configured to face occupants in the passenger cabin 18 of the funeral vehicle 12, such as family members of the deceased, for example. The sidewalls 38 are spaced apart to define a width of the support 30 that may generally correspond to a width of the center console 22 of the vehicle 12. The support 30 further includes a pair of arms 52, each extending laterally from one sidewall 38 at the top 34 of the support 30. The pair of arms 52 may define part of the top 34 of the support 30. As shown in FIG. 1, one arm 52 may be configured to extend a distance along the back of the driver's seat 24 while the other arm 52 is configured to extend a distance along the back of the passenger's seat 26. The pair of arms 52 provide the urn pedestal 10 with a generally "T"-shaped or cross-shaped appearance when viewed from the front 48 (e.g., FIG. 4).

Figure 5:
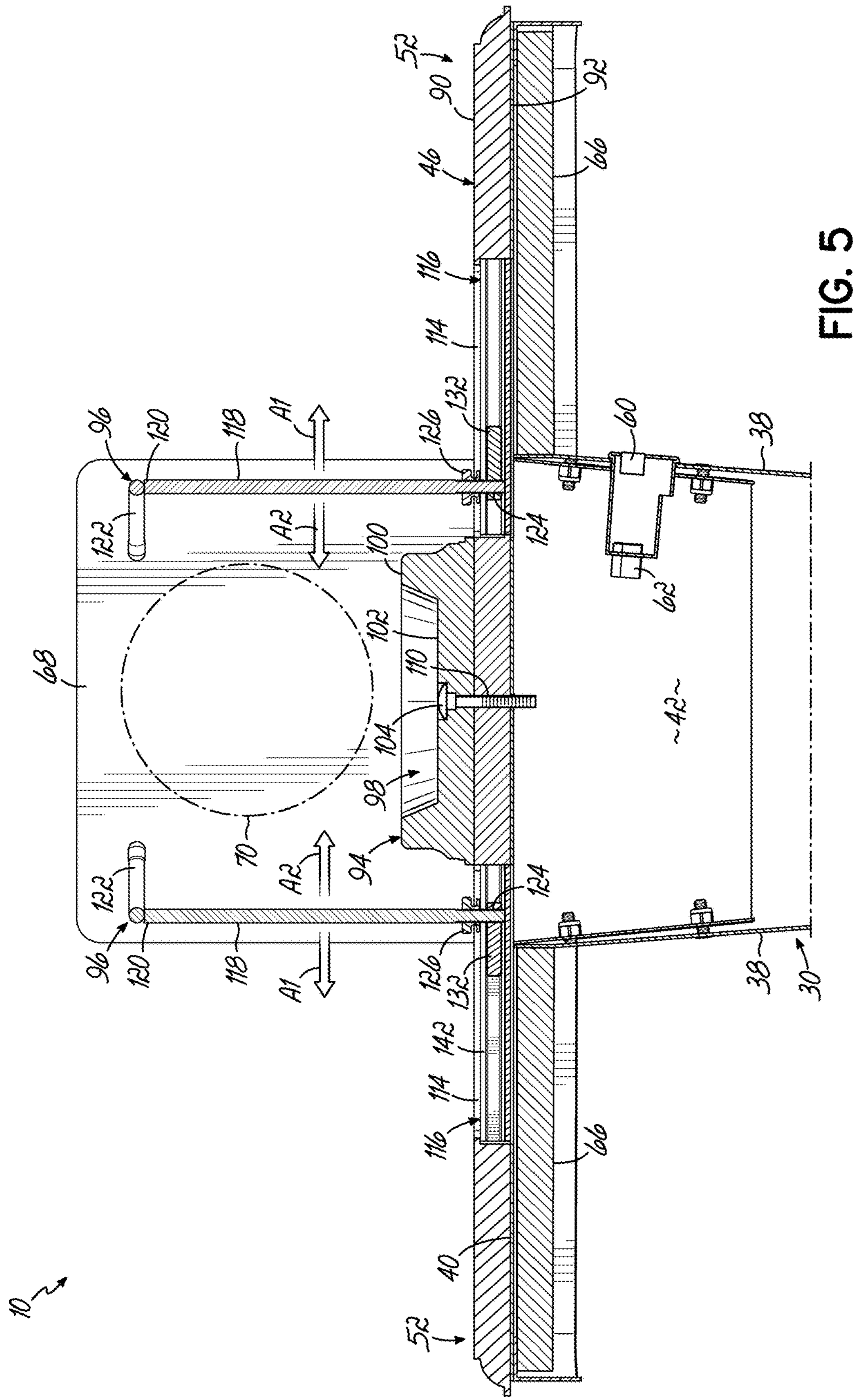
FIG. 5 is a partial cross-sectional front view of the urn pedestal, illustrating movement of the adjustable arms.
Figure 6:
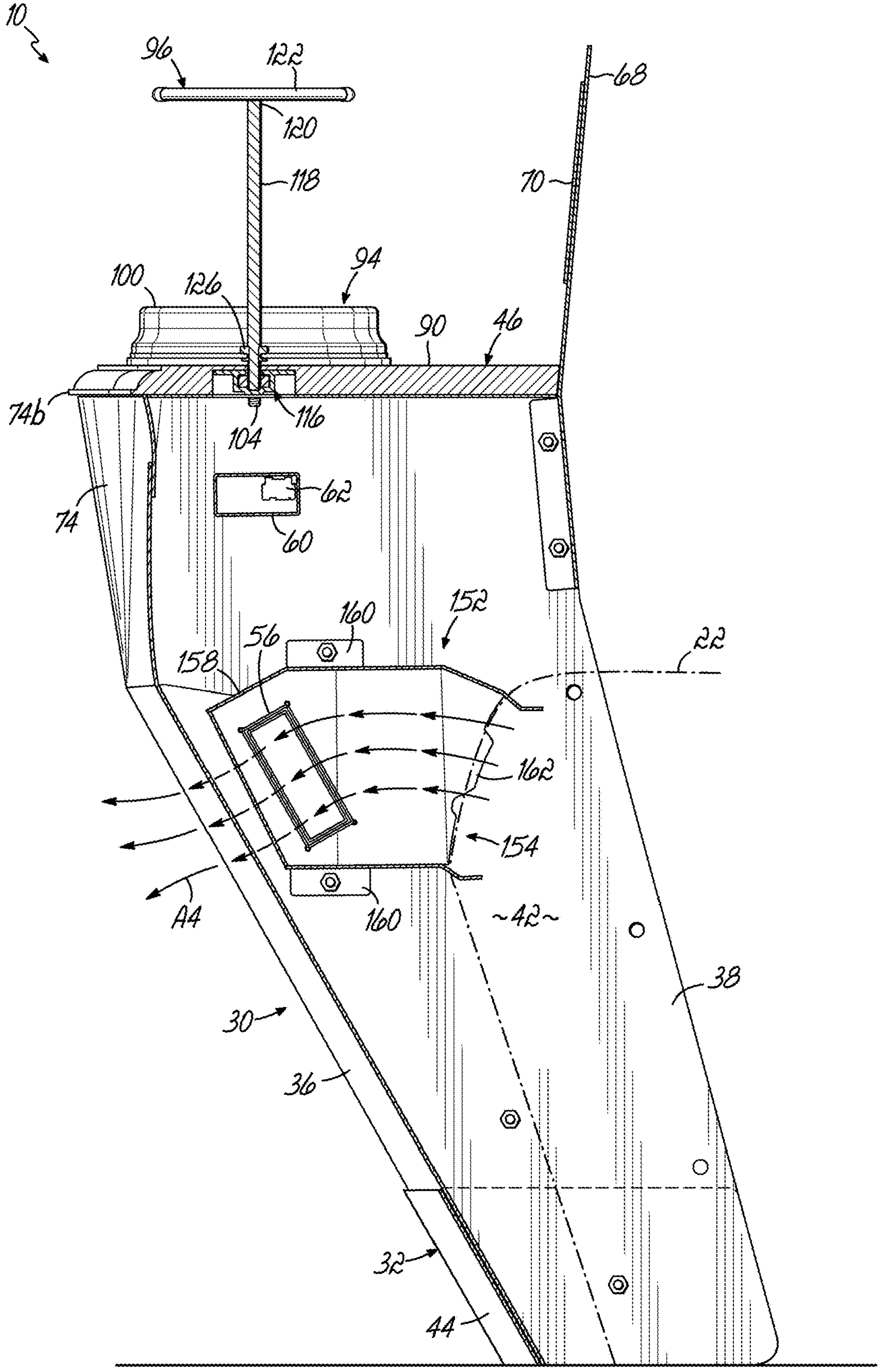
FIG. 6 is a partial cross-sectional side view of the urn pedestal, illustrating airflow through an air supply plenum of the urn pedestal.

The back 50 of the urn pedestal 10 may be open to receive a portion of the center console 22 within the interior 42 of the support 30 (e.g., FIG. 6). That way, the urn pedestal 10 may be operatively coupled to systems of the funeral vehicle 12. For instance, the urn pedestal 10 may be operatively coupled to the funeral vehicle's heating, ventilation, and air conditioning (HVAC) system 54, and each sidewall 38 may include one or more vents 56 to allow air from the vehicle's HVAC system 54 that is exhausted through the center console 22 to pass through the support 30 of the urn pedestal 10. Furthermore, the urn pedestal 10 may be operatively coupled to the funeral vehicle's electrical system 58, and includes at least one charge port or charge port bank 60 to allow one or more electronic devices to be connected to the urn pedestal 10 for charging. In the embodiment shown, the charge port 60 is located on one of the sidewalls 38 of the support 30 (e.g., FIG. 5). The charge port 60 includes a connector 62 positioned within the interior 42 of the support 30 for connecting the charge port 60 to the vehicle's electrical system 58 (e.g., FIG. 5). The charge port or charge port bank 60 may include one or more of USB-A, USB-B, USB-C, Micro-USB, and/or lighting charge port(s), for example, for use by occupants of the funeral vehicle 12 to charge one or more electronic devices.

The urn pedestal 10 may include directional lighting to highlight the urn 14 and/or to illuminate parts of the vehicle 12. In the embodiment shown, each arm 52 includes a lighting element 64*a* that is configured to cast light onto the floor of the funeral vehicle 12 (e.g., FIG. 1). The lighting elements 64*a* may be considered downlights. The lighting elements 64*a* may be used to illuminate the floor while occupants enter or exit the vehicle 12, for example. As shown in FIGS. 3 and 4, each lighting element 64*a* may located on an underside of a respective arm 52 of the support 30 and may be powered by the vehicle's 12 electrical system 58. The underside of each arm 52 may be defined by the top wall 40 of the support 30, for example. Additionally, or alternatively, each arm 52 may include a lighting element 64*b* that is configured to cast light onto the display 16, and in particular the urn 14, as shown in FIG. 2. The lighting elements 64*b* may be considered directional lighting elements, or uplighting, configured to concentrate a beam of light onto the display 16, as generally indicated by arrows A5. The lighting elements 64*a*, 64*b* may include a lens, reflective cover, and/or diffuser to direct or shape the light output of each lighting element 64*a*, 64*b* as desired. Operation of the lighting elements 64*a*, 64*b* may be controllable from the driver cabin 20 or the passenger cabin 18. To that end, the lighting elements 64*a*, 64*b* may be on dedicated lighting controller.

The urn pedestal 10 also includes a partition 68 located on the back of the support 30, extending upward from the back of the support 30 above the top of the support 30. As shown in FIG. 2, the partition 68 provides separation between the driver cabin 20 of the funeral vehicle 12 and the urn 14 and the passenger cabin 18 of the vehicle 12. In that regard, the partition 68 may serve as a privacy barrier to separate family members of the deceased, being transported in the rear of the funeral vehicle 12, from the driver of the funeral vehicle 12, for example.

With reference to FIGS. 2-4, the partition 68 may also accompany the display 16 of the urn 14. In that regard, the partition 68 may be used to present a display visual 70 directly behind the urn 14 when viewed from the front 48 of the urn pedestal 10, as shown in FIG. 4. The display visual 70 may include an electronic display, a space, a sleeve or a compartment to receive an illustration, picture, medallion, or other commemorative piece, for example. The display visual 70 may be used to display a funeral home's logo, military or sports-team crests, a picture of the deceased, or other design, illustration, or picture, for example. Alternatively, the partition 68 may be decorated with religious symbols or scenes, for example. The display visual 70 may take a wide range of forms, including letters, numbers, symbols, etc. and combinations thereof and should not be limited to the particular embodiments illustrated herein.

The front wall 36 of the support 30 is designed to be seen by the occupants of the funeral vehicle 12, and therefore features decorative elements to enhance the appearance of the display 16, including the urn 14. With reference to FIGS. 2-4, the front wall 36 may include a pair of tapered regions 72 that extend in an outward direction away from the center of the front wall 36 while simultaneously tapering in a direction toward each respective arm 52. The tapered regions 72 serve to improve the aesthetic appearance of the urn pedestal 10, for example. The front wall 36 of the support 30 may also include a decorative projection 74 adjacent to the top 34 of the urn pedestal 10. In the embodiment shown, the decorative projection 74 is faceted, having an appearance similar to the pavilion region of a diamond, for example. The decorative projection 74 results in a portion 74*a*, 74*b* of the top wall 40 and the top cover 46 of the support 30, respectively, being outwardly curved or rounded. The rounded portions 74*a*, 74*b* of the top wall 40 and the top cover 46, respectively, correspond to the location of the display 16 where the urn 14 is positioned to improve the aesthetic appearance of the urn pedestal 10, particularly when viewed from the front 48. Other shapes and configurations of the decorative projection 74 are possible, as will be understood by a person skilled in the art. In one embodiment, the front wall 36 of the support 30 may not include a decorative projection 74.

As shown in FIG. 3, the top wall 40 of the support is configured to be attached to the front wall 36 and the pair of sidewalls 38 to partially enclose the interior 42 of the support 30. The top wall 40 includes a central portion 78 and a pair of lateral portions 80 that correspond to the pair of arms 52. The lateral portions 80 of the top wall 40 may define the pair of arms 52, and the top wall 40 may be generally "T"-shaped. Each lateral portion 80 includes an elongate, generally rectangular opening 82 that is configured to provide access to a part of the removable top cover 46, as will be described in further detail below. As shown, the top wall 40 is configured to receive a plurality of fasteners 84, such as screws, for removably securing the sidewalls 38, front wall 36, and the top cover 46 to the top wall 40.

As briefly described above, the top cover 46 is configured to be removably attached to the top wall 40 of the support 30. The top cover 46 is configured to be removable to provide the ability to easily swap out top covers 46 to achieve a variety of different display 16 configurations to suit various religious, ethnic, or other family or funeral home desires. As shown, and like the top wall 40, the top cover 46 includes a central portion 86 and a pair of lateral portions 88 that correspond to the pair of arms 52. Thus, the top cover 46 is generally "T"-shaped and sized to fit over the generally "T"-shaped top wall 40 of the support 30. The top cover 46 includes a top surface 90 opposite a base surface 92 that is configured to engage the top wall 40 of the support 30, as shown in FIG. 5. In that regard, the one or more of the fasteners 84 may be threaded into the base surface 92 of the top cover 46 to secure the top cover 46 to the top wall 40. In an alternative embodiment, the top cover 46 may include clips, Dual Lock, Velcro, or other temporary fastening means suitable for removably attaching the top cover 46 to the top wall 40 of the support 30.

With reference to FIGS. 2-4, the top cover 46 includes the display 16 that is configured to present the urn 14. The display 16 includes an urn cradle 94 that is configured to receive the urn 14 and at least two adjustable support arms 96, otherwise referred to as adjustable urn arms 96, between which the urn 14 is held. The urn cradle 94 is attached to the central portion 78 of the top cover 46 to support the urn 14 generally in a center of the urn pedestal 10, as shown in FIG. 4. The urn cradle 94 includes a central recess 98 that extends from a top surface 100 of the urn cradle 94 to a base 102 of the recess 98. The recess 98 is generally sized to receive a portion of the base of the urn 14, as shown in FIG. 2. The urn cradle 94 may include magnetic or electromagnetic properties to facilitate securing of the urn 14 to the urn cradle 94. For example, the urn cradle 94 may include a magnet that corresponds to a magnet in the base of the urn 14.

The urn cradle 94 is configured to be removably attached to the top cover 46 with a fastener, such as a bolt 104, so as to be an interchangeable part to accommodate urns 14 of different shapes and sizes. To secure the urn cradle 94 to the top cover 46, the bolt 104 is configured to be received through a centrally located opening 108 formed in the base 102 of the recess 98 of the urn cradle 94, a corresponding opening 110 in the top cover 46, and another corresponding opening 112 in the top wall 40. The opening 110 in the top cover 46 and/or the opening 112 in the top wall 40 may be threaded to securely receive the bolt 104. The opening 108 in the urn cradle 94 may include a counterbore to receive a head of the bolt 104 to prevent the bolt 104 from interfering with the base of the urn 14. The urn cradle 94 is configured to receive the base of the urn 14 such that the urn 14 is supported in the urn cradle 94 in an upright position (e.g., FIG. 2). While the exemplary urn cradle 94 is circular in shape, other circular or polygonal shapes of the urn cradle 94 are possible, such as oval or square, for example. Further, the urn cradle 94 may be of various colors and styles, including translucent options with lighting underneath, and can be chosen to suit a family's or funeral director's tastes.

With continued reference to FIGS. 2-4, the top cover 46 includes at least two adjustable support arms 96 (two shown), one positioned on each side of the urn cradle 94. Each adjustable arm 96 extends through a slot 114 in the top cover 46 and is movable in a horizontal direction relative to the urn cradle 94 (and thus the urn 14) via a track 116. In that regard, the adjustable arms 96 are each movably mounted to the top cover 46. As shown in FIG. 2, the urn 14 is supported between the adjustable arms 96 by the urn cradle 94. The adjustable arms 96 may be moved horizontally relative to the urn cradle 94 and the urn 14 to clamp the urn 14 therebetween, preventing the urn 14 from tipping or falling from the urn cradle 94 while the funeral vehicle 12 is moving. In that regard, each adjustable arm 96 includes a body 118 that extends upwardly from the top of the support 30 to a distal end 120 that includes a clamp 122. In the embodiment shown, the clamp 122 is in the form of an arcuate retainer. However, the clamp 122 may be other shapes. For example, the clamp 122 may be angular to receive an urn 14 having a square-shaped body, for example. The body 118 of the adjustable arm 96 may be a rod, for example. However, the body 118 may be any other cast or machined shape. The body 118 further includes an externally threaded end 124 opposite the distal end 120. The threaded end 124 of each adjustable arm 96 is configured to be received by each track 116. Furthermore, the threaded end 124 of each adjustable arm 96 is configured to receive an internally threaded knurled knob or thumbscrew 126 that is used to secure the adjustable arm 96 in place at a desired location relative to the urn 14, as will be described in further detail below.

As shown in FIGS. 2 and 4, when the adjustable arms 96 are moved adjacent the urn 14, each clamp 122 is configured to extend partially about the circumference of the urn 14. Together, the clamps 122 may be configured to surround up to 50% or more of the circumference of the urn 14, for example. When the adjustable arms 96 are moved to a closed or clamped position, as shown in FIGS. 2 and 4, the adjustable arms 96 minimize or prevent horizontal or other movement of the urn 14 relative to the urn cradle 94. In one embodiment, the clamps 122 may contact the urn 14 when the adjustable arms 96 are moved to the clamped position. In another embodiment, the clamps 122 may be spaced from the urn 14 when the adjustable arms 96 are moved to the clamped position so as to not contact the urn 14 except to prevent tipping of the urn 14 (i.e., the urn 14 leans into temporary contact with the clamp(s) 122 before returning to the upright position). The clamps 122 may include features to allow the clamps 122 to better grip the sides of the urn 14 and/or to prevent cosmetic damage to the urn 14.

Figure 5A:
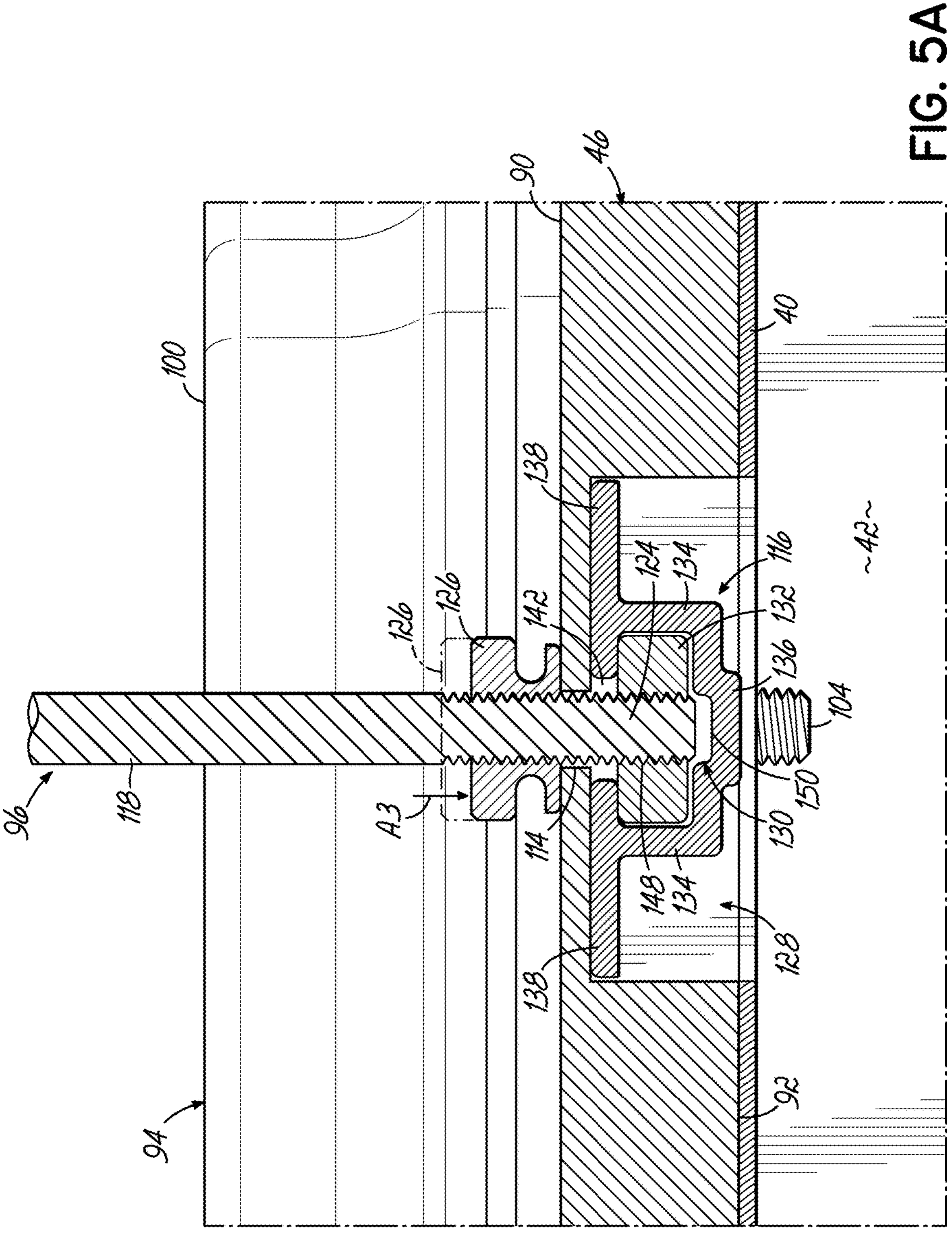
FIG. 5A is an enlarged, partial cross-sectional view of one adjustable arm, illustrating details of a track for moving the adjustable arm.

Turning now with reference to FIGS. 3, 5 and 5A, each track 116 is attached to the top cover 46 to receive a corresponding adjustable arm 96. As shown, each track 116 extends in a direction along an opposing lateral portion 88 of the top cover 46 and is recessed into the base surface 92 of the top cover 46 (e.g., FIG. 5A). In that regard, the base surface 92 of the top cover 46 includes a pair of recesses 128, each of which is configured to receive a corresponding track 116. The location of each recess 128 corresponds to the location of each slot 114, and each recess 128 is formed in a lateral portion 88 of the top cover 46. Each track 116 is configured to be received within a corresponding recess 128 and attached to the top cover 46, as shown in FIGS. 5 and 5A. When the top cover 46 is secured to the top wall 40 of the support 30, each track 116 is configured to be arranged over a corresponding elongate opening 82 in the top wall 40 of the support 30. The opening 82 provides access to the track for installation or maintenance activities, for example.

With continued reference to FIGS. 3, 5, and 5A, each track 116 includes a channel 130, also known as a T-slot channel, that extends the length of the track 116. The channel 130 is configured to receive a slide 132, also known as a sliding nut or workpiece. As best shown in FIG. 5A, the channel 130 is defined by a pair of sidewalls 134, a base wall 136, and a pair of flanges 138 that are used to mount the track 116 to the top cover 46. The channel 130 extends between opposite open ends 140 of the track 116. When the track 116 is received into the recess 128, as shown in FIG. 5, the open ends 140 of the track 116 may be blocked by the top cover 46 to prevent the slide 132 from sliding out of the channel 130. The channel 130 is generally rectangular in transverse cross-section. The slide 132 is also generally rectangular in transverse cross-section to fit within the channel 130, as shown in FIG. 5A. The channel 130 includes a width, which is the distance between the sidewalls 134. The flanges 138 overhang the channel 130 to movably retain the slide 132 therein. In particular, the slide 132 may slide within the channel 130 and along the length of the track 116, but is constrained by the flanges 138 from falling out of the channel 130. The flanges 138 define an opening 142 to the channel 130 through which the threaded end 124 of an adjustable arm 96 may be inserted to engage the slide 132. As shown, the opening 142 may have a width (i.e., the distance between the side edges of the flanges 138) that is less than the width of the channel 130. The opening 142 extends for the length of the track 116 (i.e., between the open ends 140) and may have a width that is similar, or slightly larger than the slot 114.

With reference to FIGS. 3, 5 and 5A, the track 116 is configured to be aligned with the slot 114 formed in the top surface 90 of the top cover 46. Each slot 114 extends in a direction along each lateral portion 88 of the top cover 46. While a specific location of the slots 114 and tracks 116 are shown, it will be understood that the adjustable arms 96, including the associated slots 114 and tracks 116, may be located at any position about the urn cradle 94. As shown, each slot 114 extends from a first end 144, adjacent the urn cradle 94, to a second end 146 located along the lateral portion 88 of the top cover 46. The length of the slot 114 may limit the horizontal movement distance of each adjustable arm 96. That is, the length of the slot 114 defines the horizontal movement distance for the adjustable arm 96. As shown in FIG. 5A, each slot 114 is aligned over the opening 142 to the channel 130 of the track 116 to receive the threaded end 124 of the adjustable arm 96 therethrough. The threaded end 124 of the adjustable arm 96 is received through the aligned slot 114 and opening 142 and into engagement with the slide 132. In that regard, the slide 132 includes a threaded bore 148 that is configured to threadedly receive the threaded end 124 of the adjustable arm 96. The slide 132 supports the adjustable arm 96 and is configured to guide the horizontal movement of the adjustable arm 96 relative to the urn cradle 94. As shown, the base wall 136 of the track 116 may include a groove 150 to receive the threaded end 124 of the adjustable arm 96 should it be threaded through the slide 132, for example.

The tracks 116 allow each adjustable arm 96 to move horizontally relative to the urn cradle 94, as shown by directional arrows A1 and A2 in FIG. 5. For example, the adjustable arms 96 may be moved away from the urn cradle 94 (directional arrow A1) or moved toward the urn cradle 94 (directional arrow A2). The knurled knob 126 is provided to control the horizontal movement of each adjustable arm 96. As shown, the knurled knob 126 is threaded to a portion of the threaded end 124 of the adjustable arm 96 that extends above the top surface 90 of the cover 46. To secure the adjustable arm 96 in place relative to the urn cradle 94, the knurled knob 126 may be tightened against the top surface 90 of the top cover 46 (directional arrow A3 in FIG. 5A). When the knurled knob 126 is tightened, it pulls the slide 132 against the flanges 138 of the track 116. As the knurled knob 126 is turned, the threads engage with the threaded end 124 of the adjustable arm 96 to pull the slide 132 tighter against the track 116 and the top cover 46, thereby securing the adjustable arm 96 in place. To move the adjustable arm 96, the knurled knob 126 may be loosened, releasing the slide 132 from the flanges 138 of the track 116. The slide 132 is then free to slide within the channel 130, permitting the adjustable arm 96 to move horizontally relative to the urn cradle 94.

In an alternative embodiment, each adjustable arm 96 and the knurled knob or thumbscrew 126 may be separate components. For example, the adjustable arm 96 may be fixed to a part of the slide 132 at first location while the thumbscrew 126 is located elsewhere on the slide 132. In that regard, the slide 132 and the adjustable arm 96 may be formed together a unitary piece, for example. The thumbscrew 126 may include a threaded shank that is configured to prevent movement of the slide 132 as the thumbscrew 126 is tightened. To this end, the adjustable arm 96 is configured to maintain a position of the urn 14, and the thumbscrew 126 is configured to maintain a position of the slide 132. These components may be integrated or separate.

Figure 7:
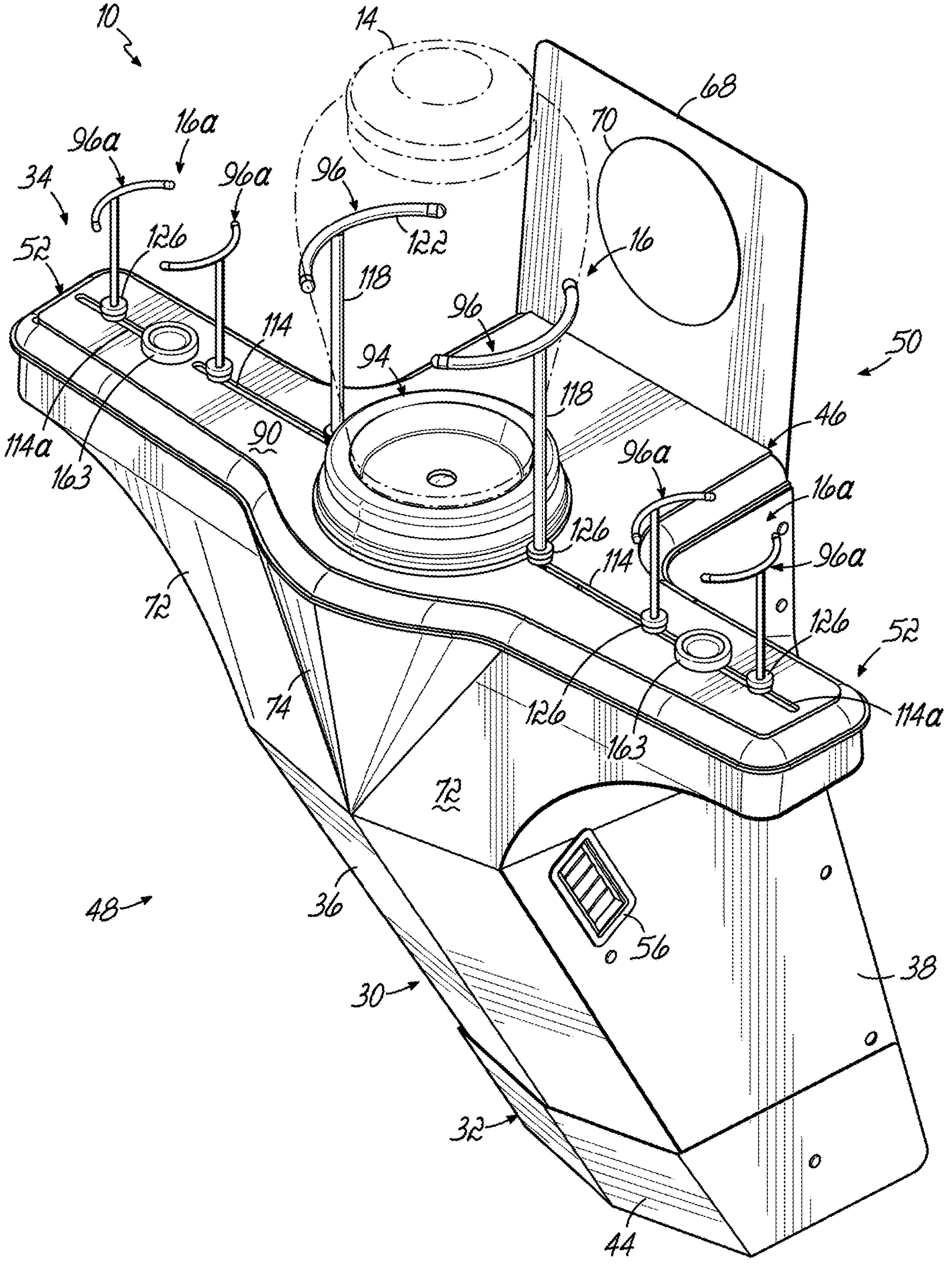
FIG. 7 is a is a front, perspective view of another embodiment of the urn pedestal, including receivers for holding a display of flowers.

As briefly described above, the support 30 includes one or more air vents 56 that are configured to allow air from the vehicle's 12 HVAC system 54 that is exhausted through the center console 22 to pass through the support 30 of the urn pedestal 10. In particular, the support 30 includes internal ductwork in the form of a supply plenum 152 that is configured to direct airflow from the HVAC system 54 of the funeral vehicle 12 to the one or more air vents 56. With reference to FIGS. 3, 6 and 7, the supply plenum 152 is located within the interior 42 of the support 30 and includes an air inlet 154 and two air outlets 156 that correspond to the air vents 56 on the sidewalls 38 of the support 30. In that regard, the supply plenum 152 includes two trunks 158 that extend from the air inlet 154 to separate the air flowing into the supply plenum 152 into two separate air supplies. Each trunk 158 extends from the air inlet 154 to a corresponding air outlet 156 to provide the supply plenum 152 with an appropriately shaped configuration. Here, the supply plenum 152 is generally "Y"-shaped. Each air outlet 156 is an opening formed in the side of the trunk 158 that is sized to receive a corresponding air vent 56. While the supply plenum 152 is illustrated as a single-piece configuration, it will be understood that the supply plenum 152 may comprise separate parts. For example, each trunk 158 may be a separate piece, having its own air inlet and air outlet, rather than a single shared air inlet.

The supply plenum 152 is configured to be mounted within the interior 42 of the support 30. In that regard, the supply plenum 152 includes a plurality of attachment tabs 160 that are configured to receive fasteners for attaching the supply plenum 152 to the support 30. As shown in FIG. 3, the fasteners may be nut and bolt combinations, for example. Regardless, the supply plenum 152 is positioned within the interior 42 of the support 30 such that when the support 30 is attached to the center console 22 of the vehicle 12, the air inlet 154 of the supply plenum 152 is operatively coupled to the center console 22 to receive conditioned air that is exhausted from the center console 22, as shown in FIG. 6. For example, the air inlet 154 of the supply plenum 152 may be received over one or more air vents 162 that exhaust conditioned air from the center console 22. As shown in FIG. 6, air exhausted from the center console 22 enters the supply plenum 152 and is dispersed to each trunk 158 and out from the support 30 via the vents 56, as indicated by directional arrows A4. Thus, conditioned air may effectively pass through the urn pedestal 10 to condition the passenger cabin 18 of the funeral vehicle 12. In an alternative embodiment, the urn pedestal 10 may be connected to an auxiliary HVAC system that is separate from the vehicle's 12 HVAC system 54.

Having now described certain details of the urn pedestal 10, a method of assembling the urn pedestal 10 with the urn 14 will now be described. In that regard, once the urn pedestal 10 is installed in the funeral vehicle 12 the urn pedestal 10 may be prepared to receive the urn 14. This includes ensuring that the desired top cover 46 and display visual 70 are installed to the urn pedestal 10. Next, the adjustable arms 96 may be moved or spaced apart and away from the urn cradle 94 so that the urn 14 may be positioned within the urn cradle 94. Once the urn 14 is positioned within the urn cradle 94, the adjustable arms 96 may be moved in a horizontal direction toward the urn cradle 94 until the urn 14 is securely held between the clamps 122 of the adjustable arms 96. Each adjustable arm 96 may then be secured in place to the top cover 46 using the knurled knob 126, as described above, to place the adjustable arms 96 in a clamped position. When in the clamped position, the urn 14 has been secured for transportation by the funeral vehicle 12. Once the funeral vehicle 12 has arrived at its destination, the adjustable arms 96 may be released (using the knurled knob 126) and spaced away from the urn 14 so that the urn 14 may be removed from the urn cradle 94.

After the completion of a first funeral service, the urn pedestal 10 may be prepared for a subsequent, second funeral service, that may involve a new urn 14. In that regard, the top cover 46 that was part of the first funeral service may be removed and replaced with a different top cover 46 for the second funeral service. The second top cover 46 may have a display 16 that is different compared to the display 16 of the first top cover 46, for example. Furthermore, the display visual 70 that was part of the first funeral service may also be removed and replaced with a different display visual 70 for the second funeral service. As will be described in further detail below, the top cover 46 may be replaced with a different top cover to allow the funeral vehicle 12 to be used to transport passengers for purposes that have nothing to do with urns or cremations.

Referring now to FIGS. 7-13, the figures show further embodiments of the urn pedestal 10. In that regard, like numerals represent like features compared to the embodiments described above with respect to FIGS. 1-6.

Referring now to FIG. 7, the figure shows another embodiment of the urn pedestal 10. The depicted embodiment of the urn pedestal 10, and in particular the top 34 of the support 30, includes at least one receiver **16*a* that is configured to receive a display of flowers. As shown, the distal end of each arm 52 may include a receiver 16*a* such that the urn pedestal 10 includes two receivers 16*a*. Each receiver 16*a* may be considered a display, for example. In either case, each receiver 16*a* includes a pair of adjustable arms 96*a*, with one arm 96*a* being positioned on either side of a holder 163 located on the top surface 90 of the top cover 46. Each of the adjustable arms 96*a* is movably attached to the top 34 of the support 30, and in particular the top cover 46. In that regard, the adjustable arms 96*a* each have the same functionality as the adjustable arms 96 described above with respect to FIGS. 1-6, but may be smaller in size, comparatively. For example, the adjustable arms 96*a* may be about half the size of the adjustable arms 96 for the urn 14**.

With continued reference to FIG. 7, an inboard adjustable arm **96*a* of each receiver 16*a* may share the track 116 and slot 114 used by one of the adjustable arms 96 for the urn 14 for movement. An outboard adjustable arm 96*a* of each receiver 16*a* may move within a separate track and slot 114*a* for movement, as shown. The slot 114*a* and associated track may have a length that is less than the length of the track 116 and slot 114 shared by the adjustable arms 96, 96*a*. Each receiver 16*a* further includes a holder 163 that is configured to receive a base of a flower display, for example. The holder 163 may be a separate piece attached to the top surface 90 of the top cover 46, as shown. Alternatively, the holder 163 may be a depression or indent formed in the top surface 90 of the top cover 46, for example. To that end, the flower display may be positioned within the holder 163 and the adjustable arms 96*a* moved to a clamped position to hold the flower display, such as a vase of the flower display, in place relative to the urn pedestal 10, particularly while the funeral vehicle 12 is driving. To this end, the adjustable arms 96*a* may be referred to as adjustable vase arms 96*a***.

Figure 8:
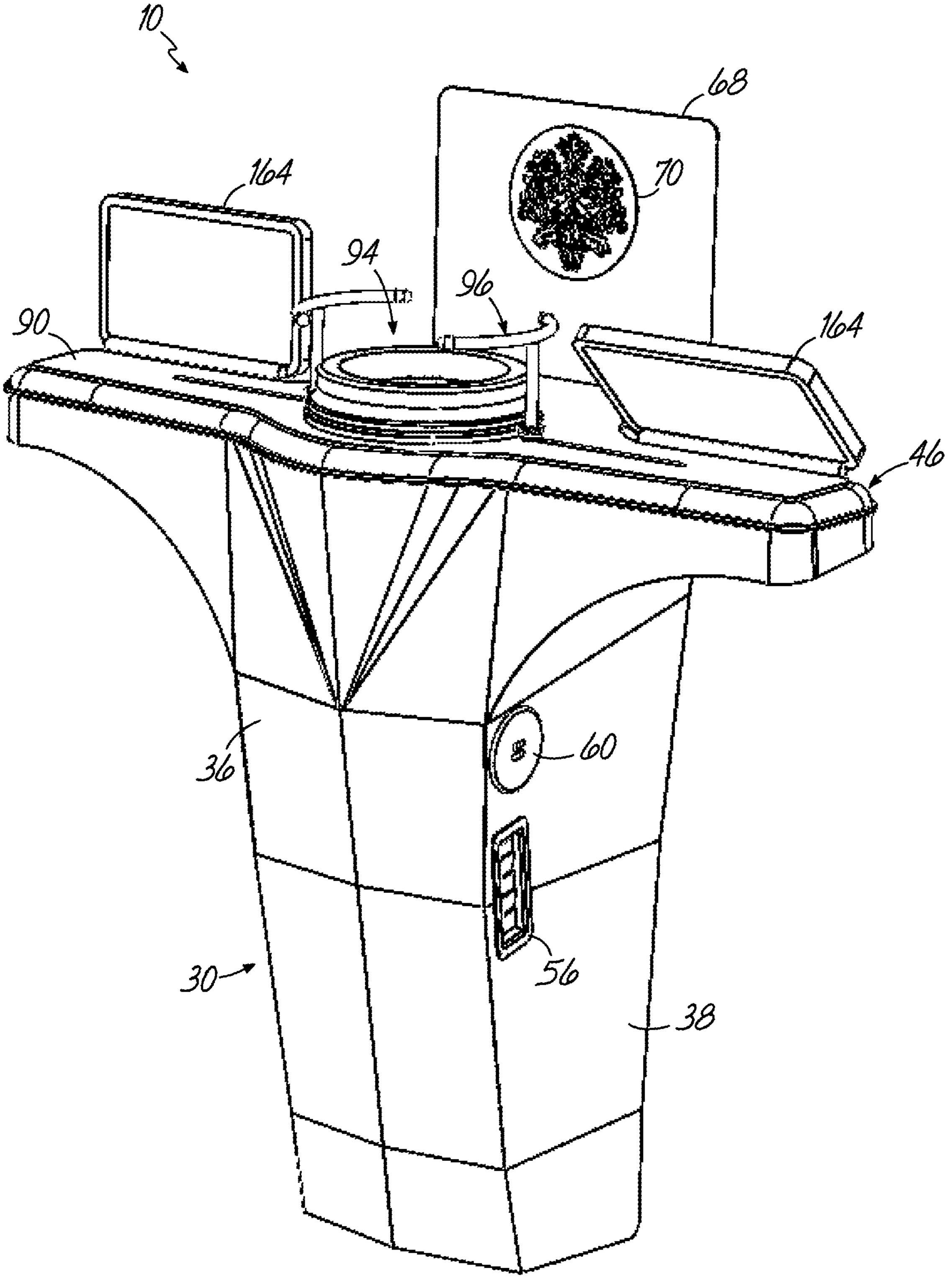
FIG. 8 is a is a front, perspective view of another embodiment of the urn pedestal, including video screens.

Referring now to FIG. 8, the figure shows another embodiment of the urn pedestal 10. The depicted embodiment of the urn pedestal 10 includes video screens 164 removably affixed to the top cover 46. The video screens 164 may be affixed in such a way as to allow the video screens 164 to pivot about their respective connections so that the video screens 164 may be stowed against the top surface 90 of the top cover 46 when not in use. The video screens 164 may be operatively connected to the funeral vehicle's 12 electrical system 58 and controllable from the driver cabin 20 or from the passenger cabin 18, for example. The video screens 164 may be incorporated into urn pedestal 10 so that family members or others riding in the funeral vehicle 12 with the urn pedestal 10 and urn 14 can view memorial videos or celebration of life videos, for example.

Figure 9:
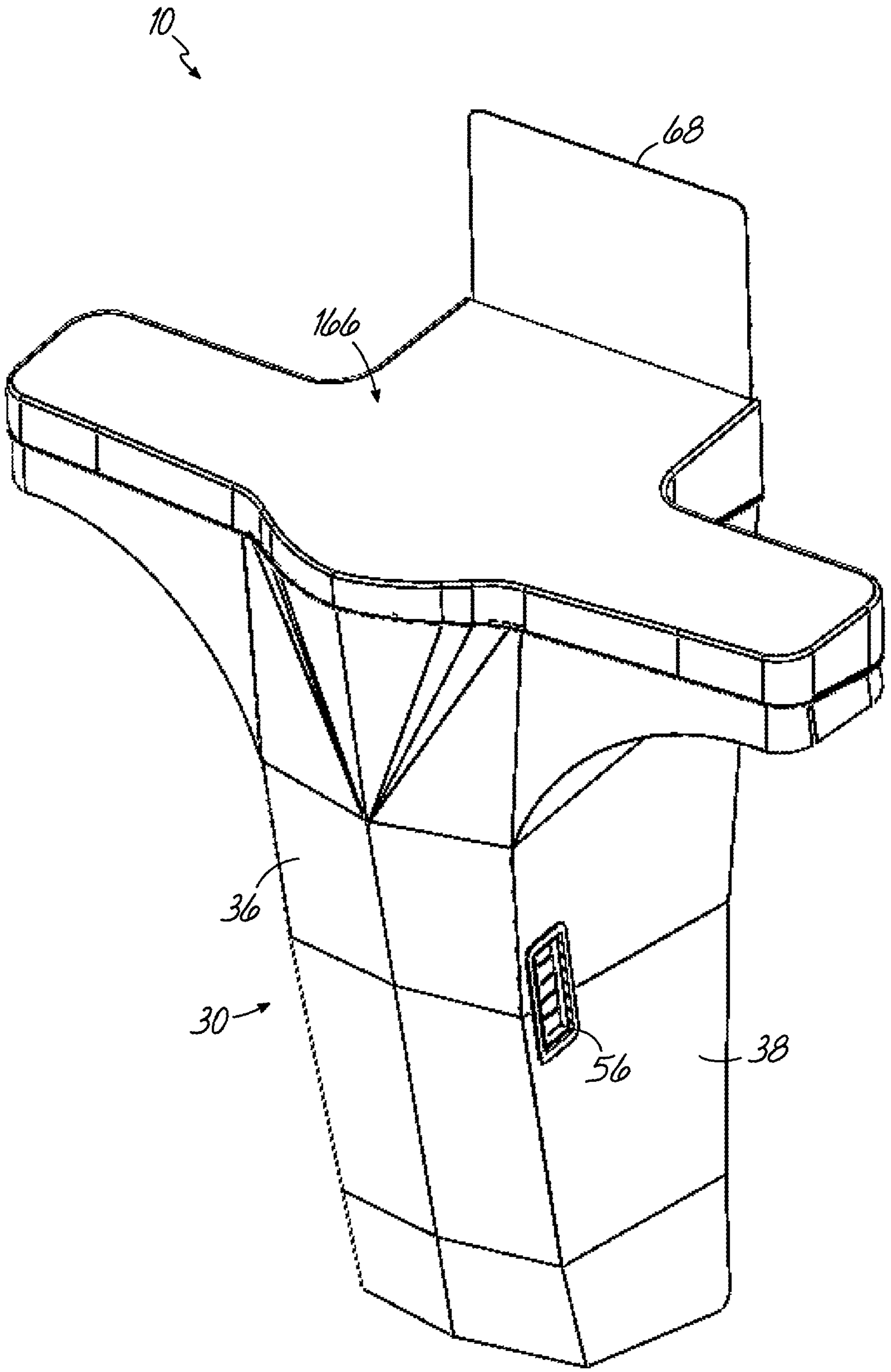
FIG. 9 is a front, perspective view of another embodiment of the urn pedestal, including a customized cover.
Figure 10:
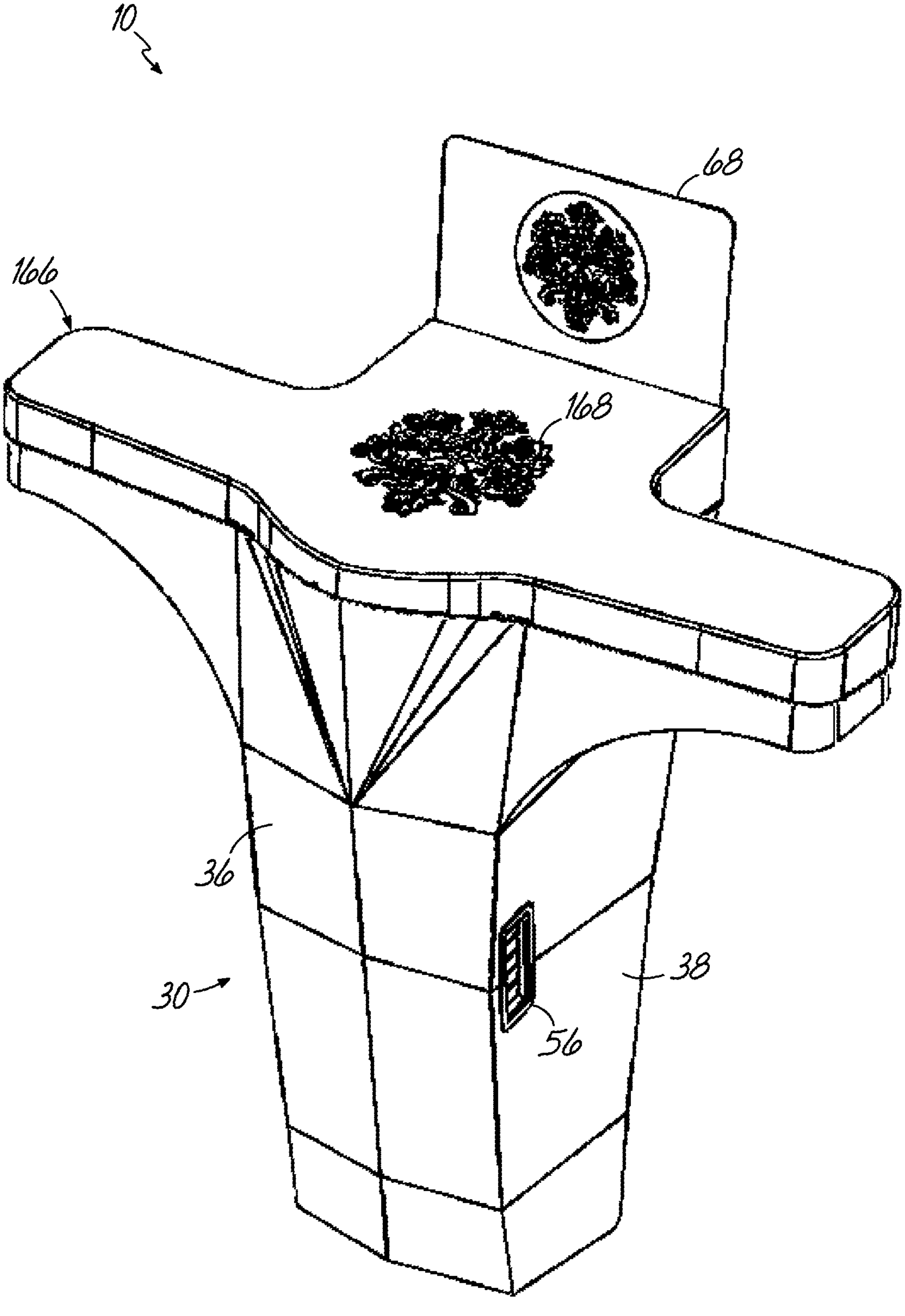
FIG. 10 is a front, perspective view of the urn pedestal of FIG. 9, illustrating the customized cover decorated with an illustration.

Referring now to FIGS. 9 and 10, the figures show further alternative embodiments of the urn pedestal 10. Specifically, these figures illustrate that the urn pedestal 10 could be used in a funeral vehicle 12 for purposes other than displaying and transporting an urn 14. For example, if the funeral vehicle 12 is used solely for transporting passengers, the urn pedestal 10 may include a top cover 166 without the urn cradle 94 and adjustable arms 96. The top surface 90 of the top cover 166 may be generally flat and plain, as shown in FIG. 9. In another embodiment, the top cover 166 may be customized with one or more decorative designs, illustrations, or pictures 168 (e.g., to match the customized display visual 70), as shown in FIG. 10.

Figure 11:
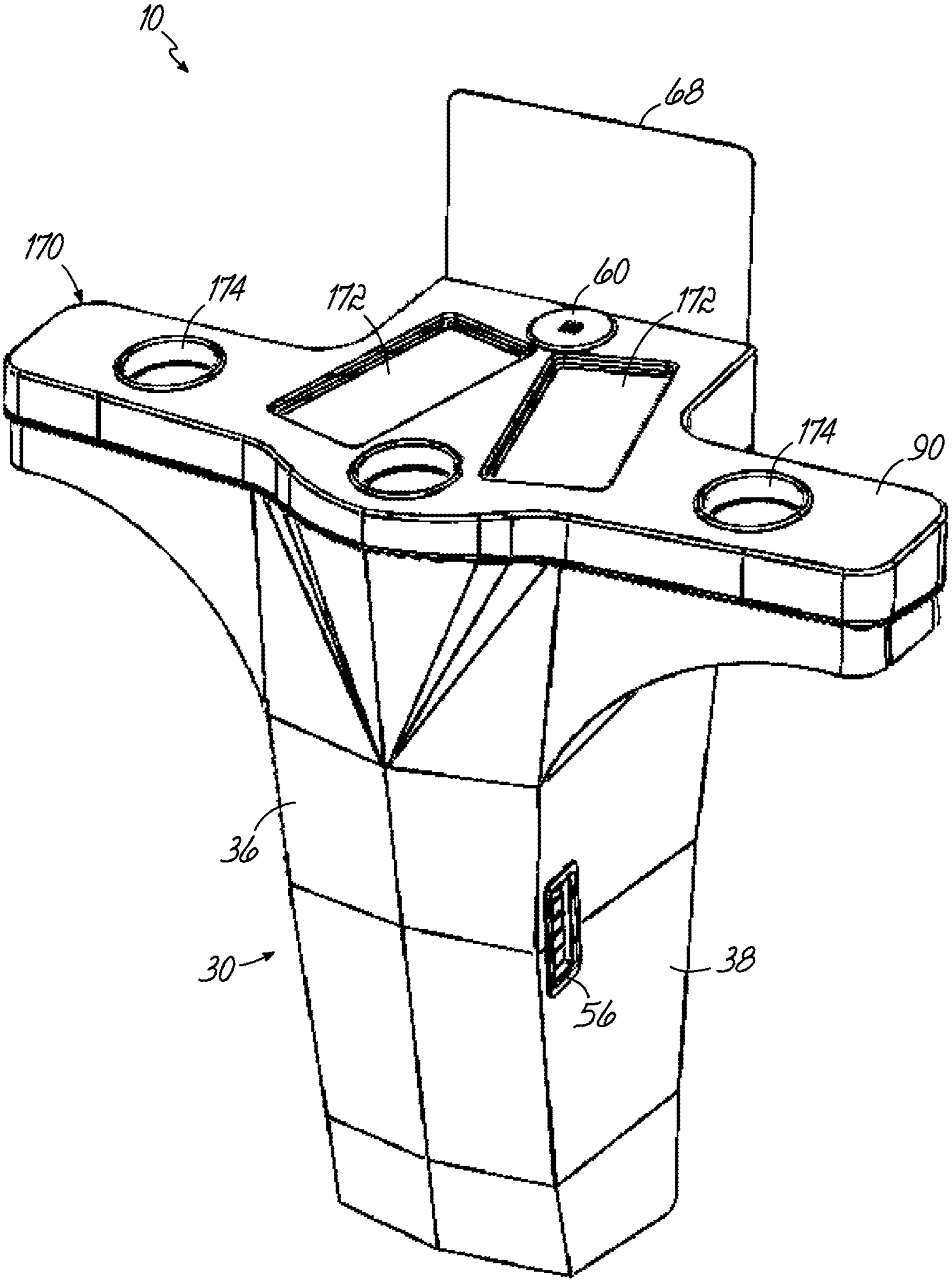
FIG. 11 is a is a front, perspective view of another embodiment of the urn pedestal in accordance with aspects of the invention.

Referring now to FIG. 11, the figure shows another embodiment of the urn pedestal 10. As shown, the urn pedestal 10 may include a top cover 170 without the urn cradle 94 and adjustable arms 96. The top surface 90 of the top cover 170 may instead include a plurality of indents in the form of one or more phone pockets 172 or cup holders 174. The top cover 170 may also include a charge port or charge port bank 60 to allow one or more electronic devices to be connected to the urn pedestal 10 for charging. The charge port 60 may be in addition to the charge port or charge port bank 60 located on the sidewall 38 of the support 30, as described above.

Figure 12:
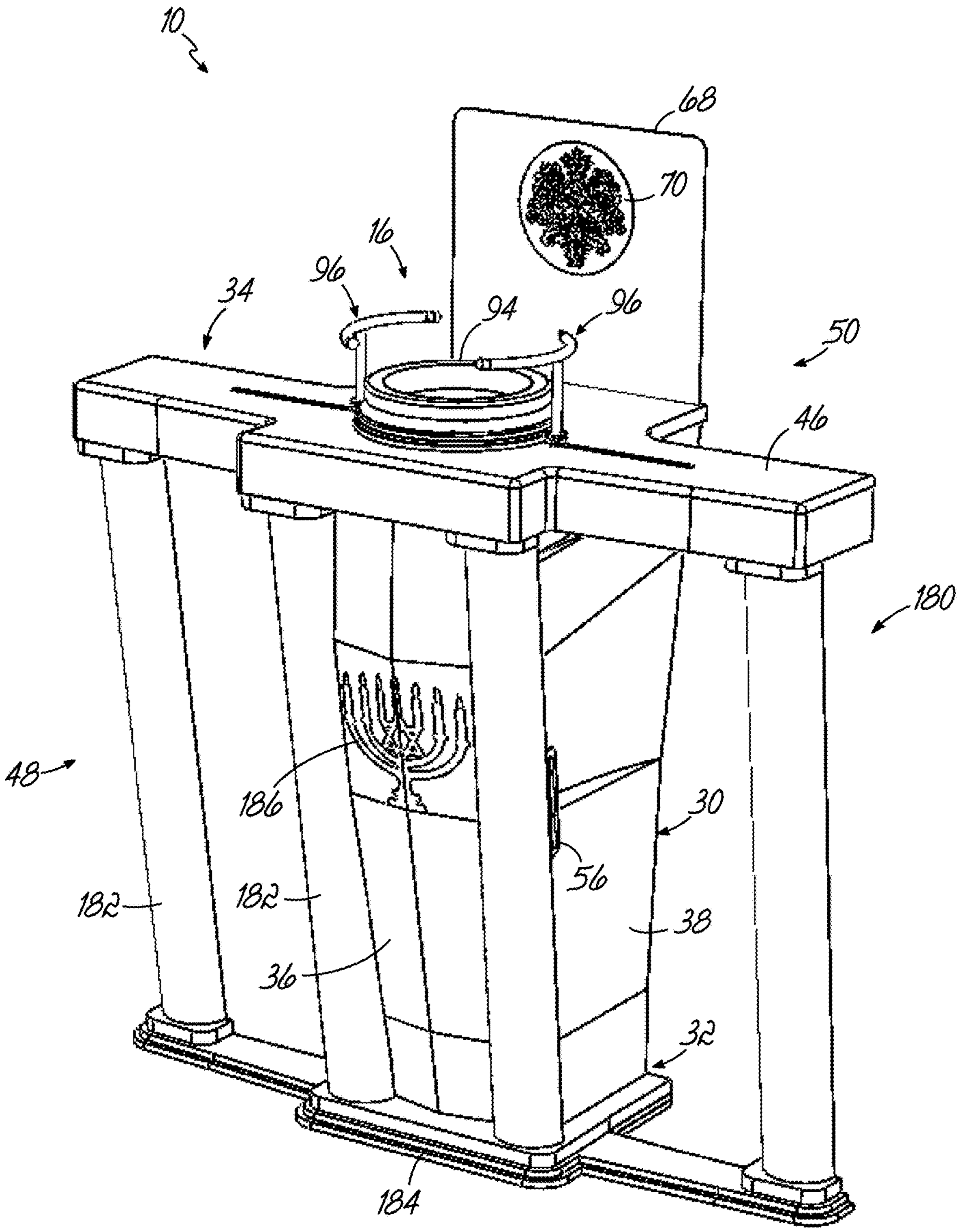
FIG. 12 is a is a front, perspective view of another embodiment of the urn pedestal, including a customized cover including an antependium.

Referring now to FIG. 12, the figure shows another embodiment of the urn pedestal 10. As shown, the support 30 of the urn pedestal 10 includes an antependium 180 that extends downward from the top of the support 30 to cover a portion of the front of the support 30. The antependium 180 is a decorative element that accompanies the display 16. For example, the antependium may enhance the display 16. The antependium 180 may include a variety of geometric features, such as panels, columns, pillars, arches, and other shapes. The antependium 180 may also be decorated with other elements, such as religious symbols, floral motifs, fabric frontal(s), or other designs elements. To that end, the antependium 180 provides the urn pedestal 10 with an appearance of an altar or stage, particularly when viewed from the front 48, that may suit various religious, ethnic, or other family or funeral home desires. In the embodiment shown, the antependium 180 includes a plurality of ornate pillars 182, such as four, that extend from the top of the support 30 to a base stand 184. The base stand 184 forms an extension of the base 32 of the support 30 and may also be ornate. The front wall 36 of the support 30 may be decorated with illustrations 186, such as religious symbols or scenes, to complement the antependium 180.

Figure 13:
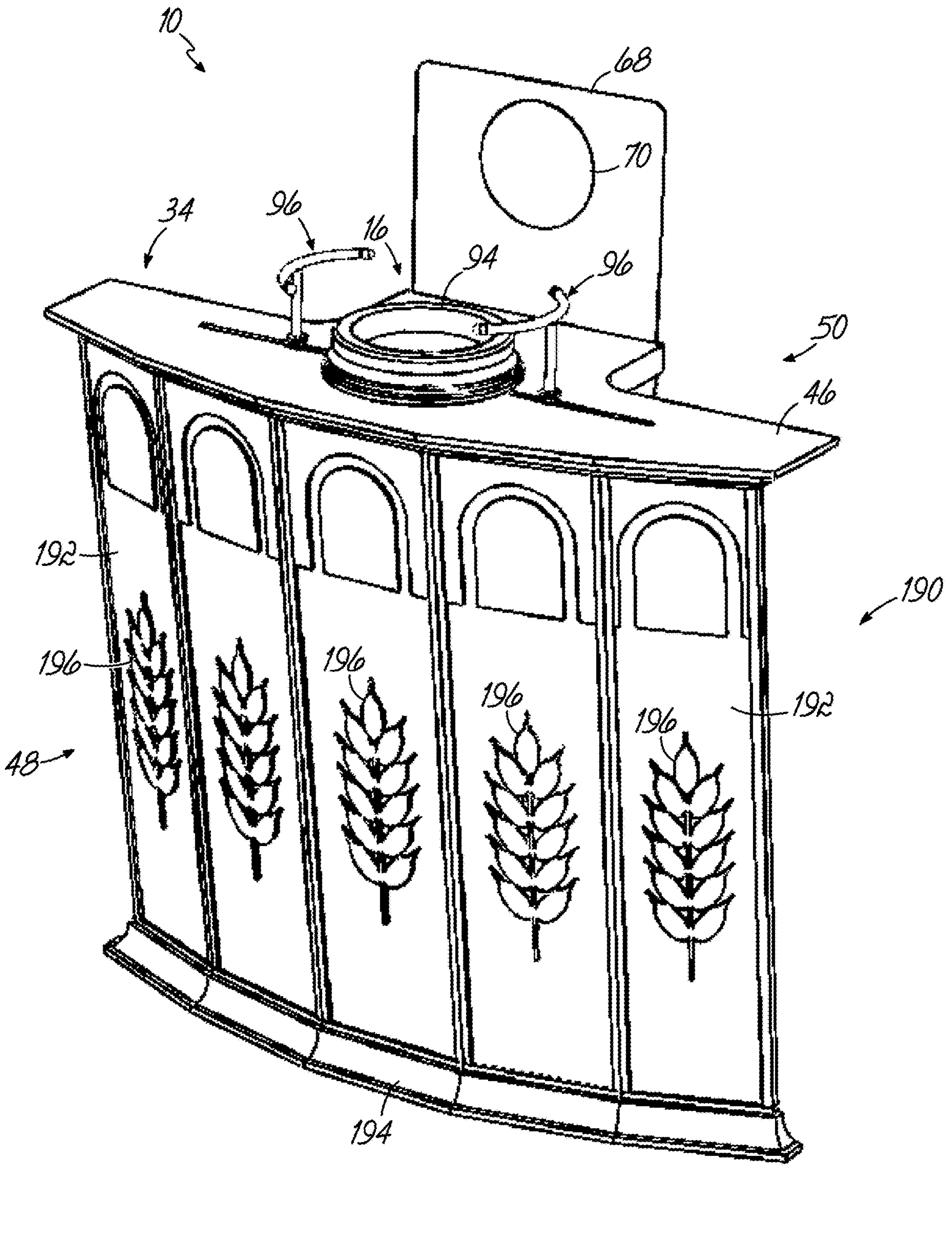
FIG. 13 is a is a front, perspective view of the urn pedestal, including a customized cover including an antependium in accordance with another embodiment of the invention.

Referring now to FIG. 13, the figure shows another embodiment of the an antependium 190 of the urn pedestal 10. As shown, the body of the antependium 190, which may comprise five ornate panels 192, extends from the top 34 of the support 30 to a base stand 194 of the antependium 190. The base stand 194 may be a structural component in addition to also being decorative and ornate. The panels 192 may be decorated with illustrations 196, such as religious symbols or scenes. In the embodiment shown, the antependium 190 may be part of the removable top cover 46, allowing the antependium 190 to be interchanged with the top cover 46. That is, the antependium 190 is attached to the top cover 46 so as to be removable from the support 30 with the top cover 46. To that end, attaching the top cover 46 to the support 30 secures the antependium 190 to the support 30.

While the present invention has been illustrated by the description of various embodiments and while these embodiments have been described in some detail, it is not the intention of the Applicant to restrict or in any way limit the scope of the invention to such detail. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A funeral vehicle, comprising:

a passenger cabin having a floor; and an urn pedestal for displaying an urn, the urn pedestal secured to the funeral vehicle such that the urn pedestal is within the passenger cabin, the urn pedestal comprising:

an elongate support having a base end, and a top end opposite the base end, the elongate support defining a longitudinal axis from the base end of the support to the top end of the support, wherein the base end and top end are spaced from each other along the longitudinal axis; and a display at the top end of the support configured to receive the urn, wherein the elongate support is configured to be secured to a part of the funeral vehicle such that the urn is displayed from within the funeral vehicle, and wherein the urn pedestal is arranged such that the display at the top end of the support is arranged vertically above the floor of the passenger cabin.

2. The funeral vehicle of claim 1, further comprising a top cover removably attached to the top end of the support, the top cover including the display.

3. The funeral vehicle of claim 1, wherein the display includes an urn cradle removably attached to the top end of the support, the urn cradle being configured to receive the urn.

4. The funeral vehicle of claim 3, wherein the urn cradle is configured to support the urn in an upright position.

5. The funeral vehicle of claim 1, further comprising a partition that extends in an upward direction from the top end of the support.

6. The funeral vehicle of claim 5, wherein the partition is configured to removably receive a display visual.

7. The funeral vehicle of claim 1, wherein the top end of the support includes one or more indents configured to receive a cup or a phone.

8. The funeral vehicle of claim 1, wherein the support includes a pair of arms, each arm extending from a side of the support, the pair of arms defining part of the top end of the support.

9. The funeral vehicle of claim 8, wherein each arm includes a lighting element that is configured to cast light onto a floor of the funeral vehicle.

10. The funeral vehicle of claim 1, wherein the top end of the support includes at least one lighting element that is configured to cast light onto the display.

11. The funeral vehicle of claim 1, wherein the support further comprises one or more charge ports that are configured to be operatively coupled to an electrical system of the funeral vehicle.

12. The funeral vehicle of claim 1, wherein the support further comprises one or more air vents that are configured to be operatively coupled to an HVAC system of the funeral vehicle.

13. The funeral vehicle of claim 12, wherein the support includes internal ductwork configured to direct airflow from the HVAC system of the funeral vehicle to the one or more air vents.

14. The funeral vehicle of claim 1, wherein the funeral vehicle includes a center console, and wherein the part of the funeral vehicle to which the support is attached is the center console and/or the floor of the funeral vehicle.

15. The funeral vehicle of claim 1, further comprising ceiling lighting configured to cast light onto the urn pedestal.

16. An urn pedestal for displaying an urn in a funeral vehicle, comprising:
an elongate support having a base end, and a top end opposite the base end, the elongate support defining a longitudinal axis from the base end of the support to the top end of the support, wherein the base end and top end are spaced from each other along the longitudinal axis; and
a display at the top end of the support configured to receive the urn,
wherein the support is configured to be secured to a part of the funeral vehicle such that the urn is displayed from within the funeral vehicle,
wherein the display includes;
at least two adjustable arms; and
at least two tracks in the top end of the elongate support with each track being configured to movably receive one of the at least two adjustable arms such that the urn is configured to be received between the at least two adjustable arms, and the at least two adjustable arms are movable in a horizontal direction relative to the urn.

17. The urn pedestal of claim 16, wherein each adjustable arm extends from the top end of the support to a distal end that includes a clamp that is configured to extend partially about the urn.

18. An urn pedestal for displaying an urn in a funeral vehicle, comprising:
an elongate support having a base end, and a top end opposite the base end, the elongate support defining a longitudinal axis from the base end of the support to the top end of the support, wherein the base end and top end are spaced from each other along the longitudinal axis; and
a display at the top end of the support configured to receive the urn,
wherein the support is configured to be secured to a part of the funeral vehicle such that the urn is displayed from within the funeral vehicle, and
wherein the support includes an antependium that extends downward from the top end of the support to cover a portion of a front of the support.

19. The urn pedestal of claim 18, wherein the antependium extends from the top end of the support to the base end of the support.

20. An urn pedestal for displaying an urn in a funeral vehicle, comprising:
an elongate support having a base end, and a top end opposite the base end, the elongate support defining a longitudinal axis from the base end of the support to the top end of the support, wherein the base end and top end are spaced from each other along the longitudinal axis; and
a display at the top end of the support configured to receive the urn,
wherein the support is configured to be secured to a part of the funeral vehicle such that the urn is displayed from within the funeral vehicle, and
wherein the top end of the support includes one or more video screens.

21. An urn pedestal for displaying an urn in a funeral vehicle, comprising:
an elongate support having a base end, and a top end opposite the base end, the elongate support defining a longitudinal axis from the base end of the support to the top end of the support, wherein the base end and top end are spaced from each other along the longitudinal axis; and
a display at the top end of the support configured to receive the urn,
wherein the support is configured to be secured to a part of the funeral vehicle such that the urn is displayed from within the funeral vehicle,
wherein the top end of the support includes at least one receiver that is configured to receive a display of flowers, and
wherein the at least one receiver includes at least two adjustable vase arms movably attached to the top end of the support, the display of flowers being configured to be received between the at least two adjustable vase arms.

22. A method of installing an urn pedestal for displaying an urn in a funeral vehicle, the method comprising:
providing the urn pedestal, comprising:
an elongate support having a base end, and a top end opposite the base end, the elongate support defining a longitudinal axis from the base end of the support to the top end of the support, wherein the base end and top end are spaced from each other along the longitudinal axis; and
a first top cover removably connected to the top end of the elongate support, the first top cover including a first display for receiving the urn, and the first top cover having a first design;
securing the urn pedestal to a part of the funeral vehicle such that the base end of the support is adjacent a floor of the funeral vehicle and the top end is spaced above the floor of the funeral vehicle;
removing the first top cover from the top end of the support; and
installing a second top cover to the top end of the support, the second top cover including a second display for receiving the urn, and the second top cover having a second design different than the first design.

23. The method of claim 22, wherein the support further includes a partition that extends in an upward direction from the top end of the support, the partition being configured to removably receive a display visual, the method further comprising:
removing a first display visual from the partition; and
installing a second display visual to the partition.

* * * * *